No. 716,861. Patented Dec. 30, 1902.
W. BÜGLER.
APPARATUS FOR MANUFACTURING ARTIFICIAL STONE.
(Application filed June 5, 1901.)
(No Model.) 4 Sheets—Sheet 1.
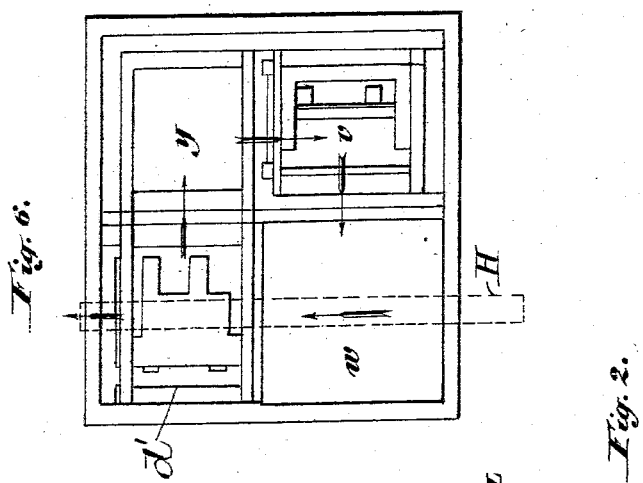
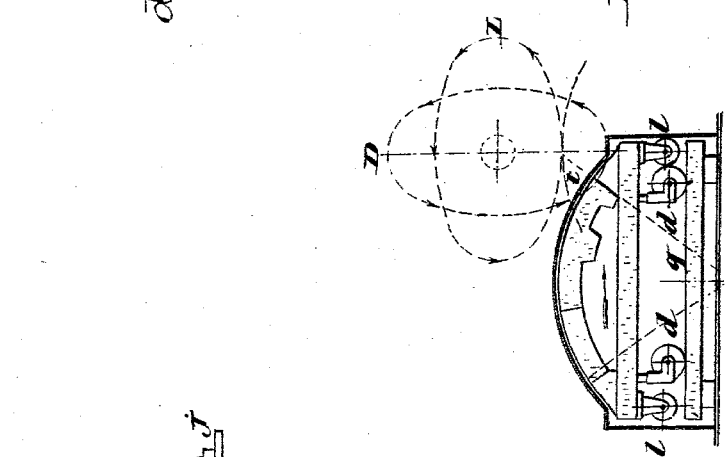
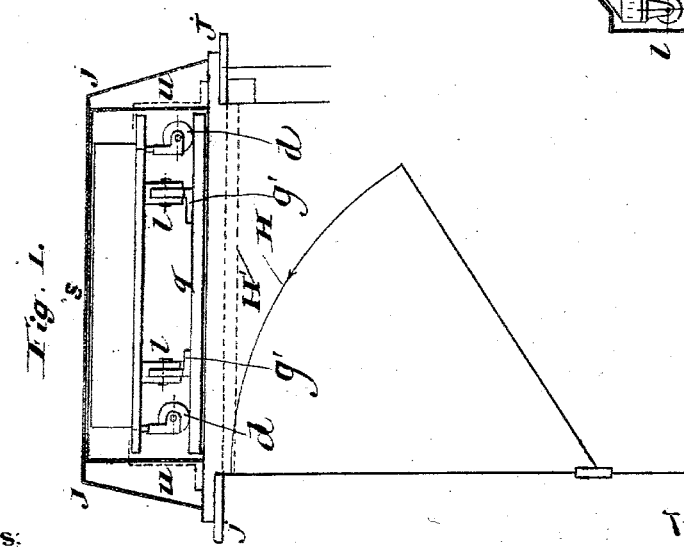
Witnesses:
G. S. Noble
Jacob Heller
Inventor,
Wilhelm Bügler
by B. Singer
Att'y.

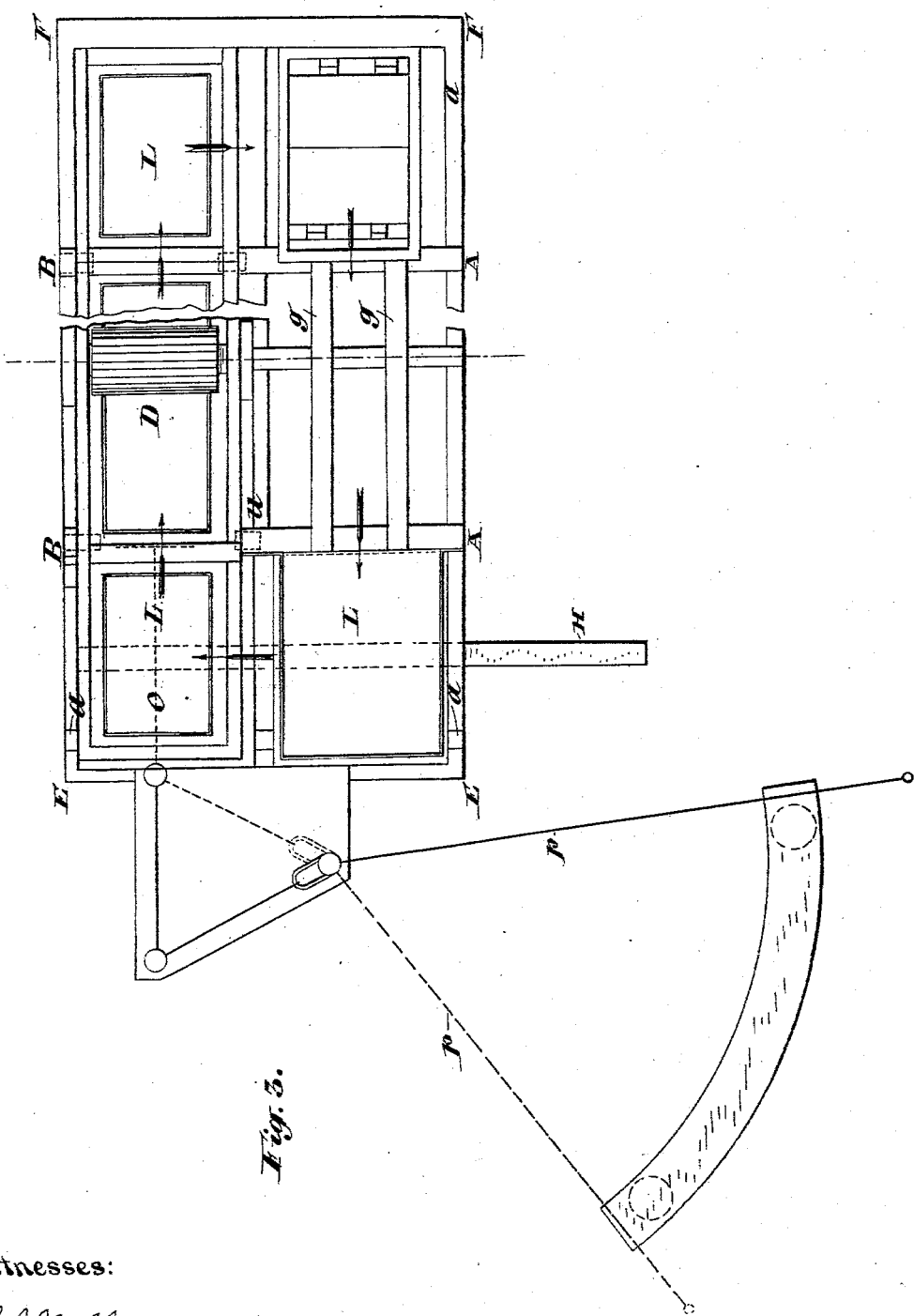

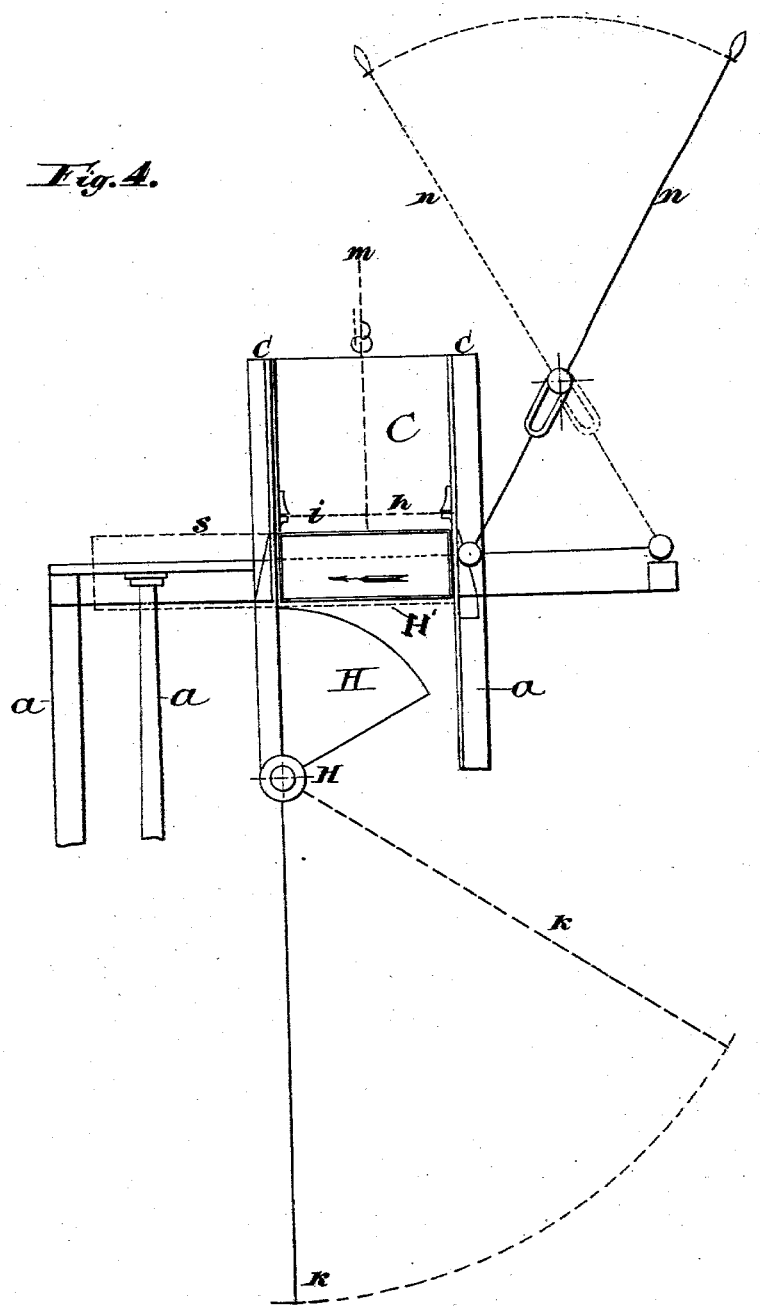

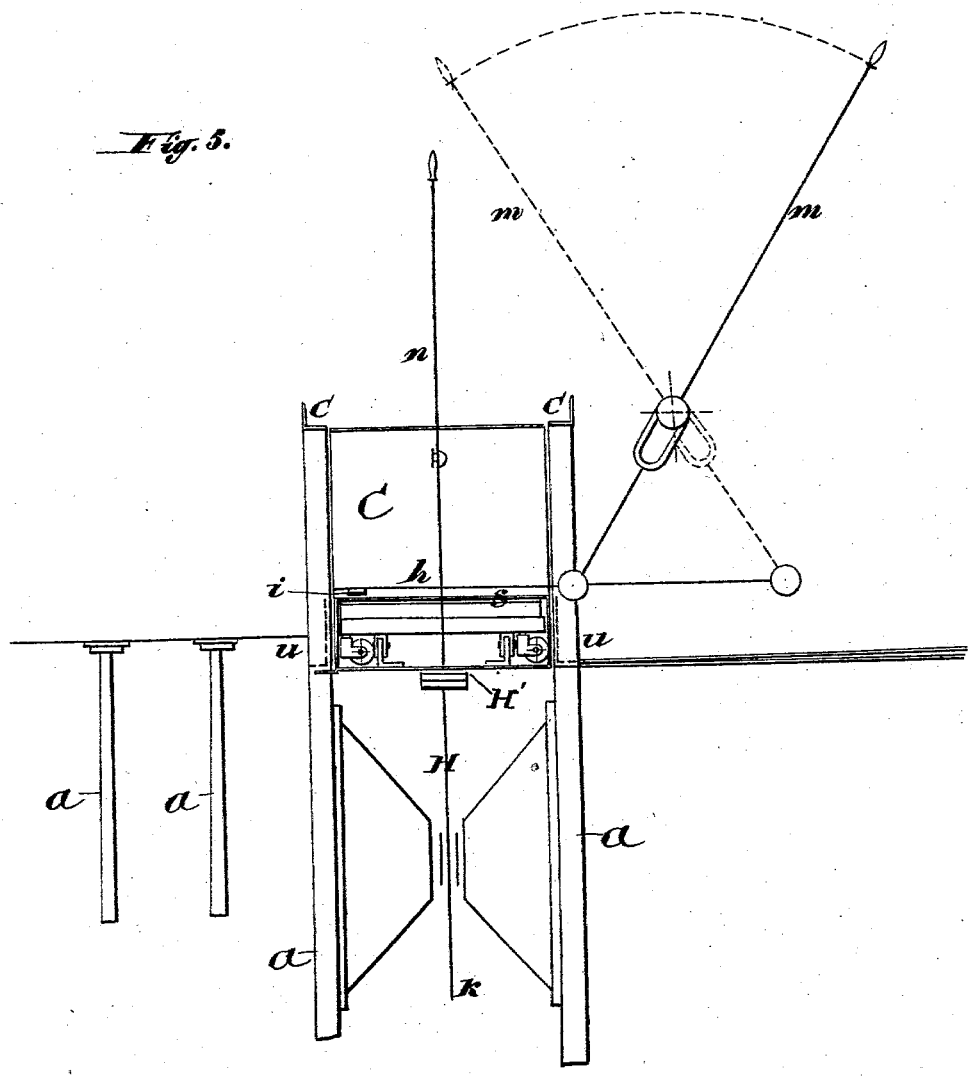

UNITED STATES PATENT OFFICE.

WILHELM BÜGLER, OF STUTTGART, GERMANY.

APPARATUS FOR MANUFACTURING ARTIFICIAL STONE.

SPECIFICATION forming part of Letters Patent No. 716,861, dated December 30, 1902.

Application filed June 5, 1901. Serial No. 63,236. (No model.)

*To all whom it may concern:*

Be it known that I, WILHELM BÜGLER, a subject of the German Emperor, and a resident of Stuttgart, Germany, have invented certain new and useful Improvements in Apparatus for Manufacturing Artificial Stone, of which the following is a specification.

The object of this invention is to provide improved apparatus for the manufacture of slabs and arches of artificial stone for general purposes, but more especially for drains and water-mains.

In the accompanying drawings, Figure 1 is a cross-section of the apparatus. Fig. 2 is a longitudinal section. Fig. 3 is a plan view. Fig. 4 is a side view. Fig. 5 is an elevation of the said apparatus, and Fig. 6 is a plan of a modification.

In contradistinction to the well-known method in which the molds, made of cement, plaster, or clay, are fastened on an endless belt and pass in front of a hopper, from which they are filled and then caused to pass under compression-cylinders, in this apparatus for making solid slabs of compressed concrete the molds are placed in separate wagons, each of which is fitted with a pair of wheels or rollers $d\ d$, Figs. 1 and 2, running on rails $g$, placed on two parallel longitudinal tables A A, B B, Fig. 3, and are brought beneath the filling device C C, Figs. 4 and 5, whence they return full to their starting-point. The rails $g$ for the wagons containing the empty molds, Figs. 3 and 5, are slightly inclined, and the table for the full molds is provided with a roller D, Figs. 2 and 3, in order to form compressed concrete. To each end of the longitudinal table is connected a transverse table E E, F F with rails $g'$, Figs. 1, 3, 4, and 5, the top of which reposes on uprights $a$, Figs. 3, 4, and 5. The transverse table E E serves to receive the filling-case C, Figs. 4 and 5. Below the level of the top of the table is arranged a toothed driving-gear H, Figs. 1, 2, 3, and 4, operating a rack H', to which is fastened the cutting device J J, Figs. 1 and 2, surrounding the path of the mold-wagons, and the transverse table, Figs. 1 and 2. The cutter is moved by the rack backward and forward in the direction of the width of the mold. The filling-hopper C is placed exactly above the knife $s$, Figs. 1, 2, 4, and 5, and its lower side is close to the upper surface of the latter. A few centimeters higher in the filling-hopper is placed a movable bottom $h$, Figs. 4 and 5, on the lower side of which is fixed a strong semicircular presser $i$, Fig. 5. Supposing the wagon containing the empty molds to be under the cutting-blade, the latter is pushed forwardly by a pedal-lever $k$, Figs. 4 and 5. The bottom of the hopper is opened by the lever $m$, Figs. 4 and 5, and allows the filling material to pass into the empty mold. The mass, which is still in a plastic state, will fill the mold. When the bottom is closed, this mass will be compressed by the semicircular presser $i$ and forced against the walls of the mold. If now the cutting device be pushed backwardly, the plastic mass remaining between the mold and the bottom of the hopper will be cut off and separated. The slab will then have the required shape. On the outside of this transverse table E E, Fig. 3, is pivoted on a suitable support a horizontal lever $p$, the use of which is to push forwardly the wagon L, containing full molds, Fig. 3, on the second longitudinal table B B, to which it has been pushed by the lever $n$, Figs. 4 and 5. The lever $p$ pushes the wagon along said table and causes it to pass beneath rollers D to the other transverse table F F, after which the full mold is lifted out and put on one side. The wagon is then drawn to the rear of the first longitudinal table A A, another empty mold is placed in it, and it is driven along said table upon the guide-rails $g\ g$ thereon until it reaches the end of the table and is once more at the transverse table E E.

It will be observed that the tracks $g$ on the longitudinal tables are lower than the tracks $g'$ on the transverse tables, Fig. 1, and that there is a corresponding difference in the elevation of rollers $d$ and $l$, so that when a wagon reaches the end of a longitudinal table on tracks $g$ it may be immediately pushed upon a transverse table on tracks $g'$.

To produce arched pieces, the parallel tables must be separated to the width of the mold-wagons, and in front of the transverse table E E should be placed a longitudinal piece, above which the two transverse tables will be placed, and the expelling-lever $n$, Figs.

4 and 5, will be lengthened to half the width of the wagon. If now the empty wagon is placed in front of the cutting device, it is pushed by hand to the right, to the front, and to the rear under the latter device. In order that the back part of the mold-wagons will not be uplifted during the joining, arranged above the rollers at the place on the frame occupied by the ends of the wagon are angle-irons, Fig. 3.

In treating a mass of clay, earth, or cement mixture, which has to be submitted to an ordinary pressure without rolling, the construction of the apparatus is much simplified. There only remain two transverse tables provided with the filling and cutting-off devices, along with two mold-wagons on wheels. The rails, rollers, and the lever $n$ are dispensed with, as in Fig. 6. An empty mold $v$ is moved toward $w$. The cutting device J J, Figs. 1 and 2, is thrown out of gear by the pedal-lever $k$. The bottom of the filling-hopper is opened by the lever $m$, Figs. 4 and 5. Then it is closed. All this is performed by one person. A second person, stationed opposite the first, returns the cutting-blade. The full mold is withdrawn on $d'$ and emptied. The empty wagon is moved to $y$. The empty molds are introduced and returned to $v$. For arched or vaulted pieces it is necessary to make the turn from $d'$ toward $w$ $v$ $y$.

The advantages obtained by means of these devices are as follows: the return of the empty molds on mold-wagons without an endless belt, automatic filling and compression, smoothing of the surface by cutting without being rolled, return by hand and by means of levers facilitated by wheels, a saving of time owing to the exact limitation of the various movements, formation of compressed concrete for temporary high pressure by means of a series of rollers, applicability to all kinds of filling material. With the rollers described the end of the mold $t$, Fig. 2, bears against the oval roll D, which turns, and the periphery of which passes over the arched part of the mold until it attains a horizontal position in the middle of the latter and finally regains its vertical position after half a revolution. The following mold effects the continuation of the rotary movement.

Having fully described my invention, what I claim, and desire to secure by Letters Patent, is—

1. In an apparatus for the manufacture of artificial stone, bricks and the like, the combination of traveling wagons, molds for placement therein, and which receive the material to be treated, and a suitable roller under which said wagons carry the molds and material.

2. In an apparatus for the manufacture of artificial stone, bricks and the like, the combination of wagons provided with wheels, two longitudinal tables parallel to each other and having rails, the table receiving the full molds being horizontal while that for the empties is slightly inclined, and two transverse tables connecting the longitudinal tables, substantially as described and as shown.

3. In an apparatus for the manufacture of artificial stone, bricks and the like, the combination of wagons provided with wheels, two longitudinal tables parallel to each other and having rails, the table receiving the full molds being horizontal while that for the empties is slightly inclined, two transverse tables, and a filling-hopper placed upon one of the transverse tables.

4. In an apparatus for the manufacture of artificial stone, bricks and the like, the combination of wagons provided with wheels, two longitudinal tables parallel to each other and provided with rails, the table receiving the full molds being horizontal while that for the empties is slightly inclined, two transverse tables connecting said tables, a filling-hopper upon one of said transverse tables, a cutting-off device placed directly under the said filling-hopper and consisting of a semicircular blade connected to suitably-pivoted levers, substantially as described and as shown.

In testimony whereof I have hereunto set my hand in presence of two witnesses.

WILHELM BÜGLER.

Witnesses:
 WM. HAHN,
 H. E. REICHERDT.